United States Patent
Steinich et al.

(10) Patent No.: US 8,800,153 B2
(45) Date of Patent: Aug. 12, 2014

(54) MEASURING RING WITH MEASURING TAPE AND METHOD FOR ARRANGING THE MEASURING TAPE

(75) Inventors: Klaus Manfred Steinich, Zorneding/Pöring (DE); Gunnar Kamp, Erding (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 225 days.

(21) Appl. No.: 13/450,183

(22) Filed: Apr. 18, 2012

(65) Prior Publication Data

US 2012/0272541 A1  Nov. 1, 2012

(30) Foreign Application Priority Data

Apr. 26, 2011  (DE) .......................... 10 2011 018 529
Apr. 26, 2011  (DE) ..................... 20 2011 005 539 U

(51) Int. Cl.
- *G01B 5/24* (2006.01)
- *G01D 5/347* (2006.01)
- *G01D 5/244* (2006.01)

(52) U.S. Cl.
CPC ........ *G01D 5/24433* (2013.01); *G01D 5/34707* (2013.01); *G01D 5/24442* (2013.01)
USPC ................. 33/1 PT; 33/706; 33/1 N

(58) Field of Classification Search
USPC ................. 33/555.4, 1 PT, 1 N, 706, 707, 708
See application file for complete search history.

(56) References Cited

U.S. PATENT DOCUMENTS

| | | | | |
|---|---|---|---|---|
| 4,459,754 A * | 7/1984 | Yasuda et al. | .................. | 33/701 |
| 6,009,631 A * | 1/2000 | Gensler | ........................ | 33/555.4 |
| 6,098,295 A * | 8/2000 | Feichtinger | .................. | 33/1 PT |
| 6,523,268 B1 * | 2/2003 | Boge | ............................. | 33/1 PT |
| 6,612,048 B2 * | 9/2003 | Peterlechner et al. | .......... | 33/755 |
| 6,637,118 B2 * | 10/2003 | Feichtinger | .................. | 33/1 PT |
| 7,032,317 B2 * | 4/2006 | Hertenberger et al. | ......... | 33/1 N |
| 7,571,552 B2 * | 8/2009 | McAdam | ........................ | 33/706 |
| 2010/0162582 A1 * | 7/2010 | Shiao et al. | ..................... | 33/708 |
| 2013/0111776 A1 * | 5/2013 | Beutler et al. | .................. | 33/707 |

FOREIGN PATENT DOCUMENTS

| | | |
|---|---|---|
| AT | 410372 B | 8/2002 |
| DE | 19611983 C1 | 7/1997 |
| DE | 19751019 A1 | 6/1999 |
| DE | 19956833 A1 | 5/2001 |
| DE | 10311098 A1 | 9/2004 |
| WO | WO2010079254 A2 | 7/2010 |

\* cited by examiner

*Primary Examiner* — Christopher Fulton
(74) *Attorney, Agent, or Firm* — Head, Johnson & Kachigian, P.C.

(57) ABSTRACT

In order to be able to compensate different temperature expansion of a magnetic tape, (measuring tape) and a support ring in an angle sensor where the magnetic tape is applied to a circumference of a component and where a scanning head is used, the magnetic tape is fixated at the support ring at the most at one location of the circumference and otherwise supported at the circumference with a tension band, so that the measuring tape can perform a movement relative to the support ring, and/or the tension band due to the expansion in circumferential direction.

16 Claims, 9 Drawing Sheets

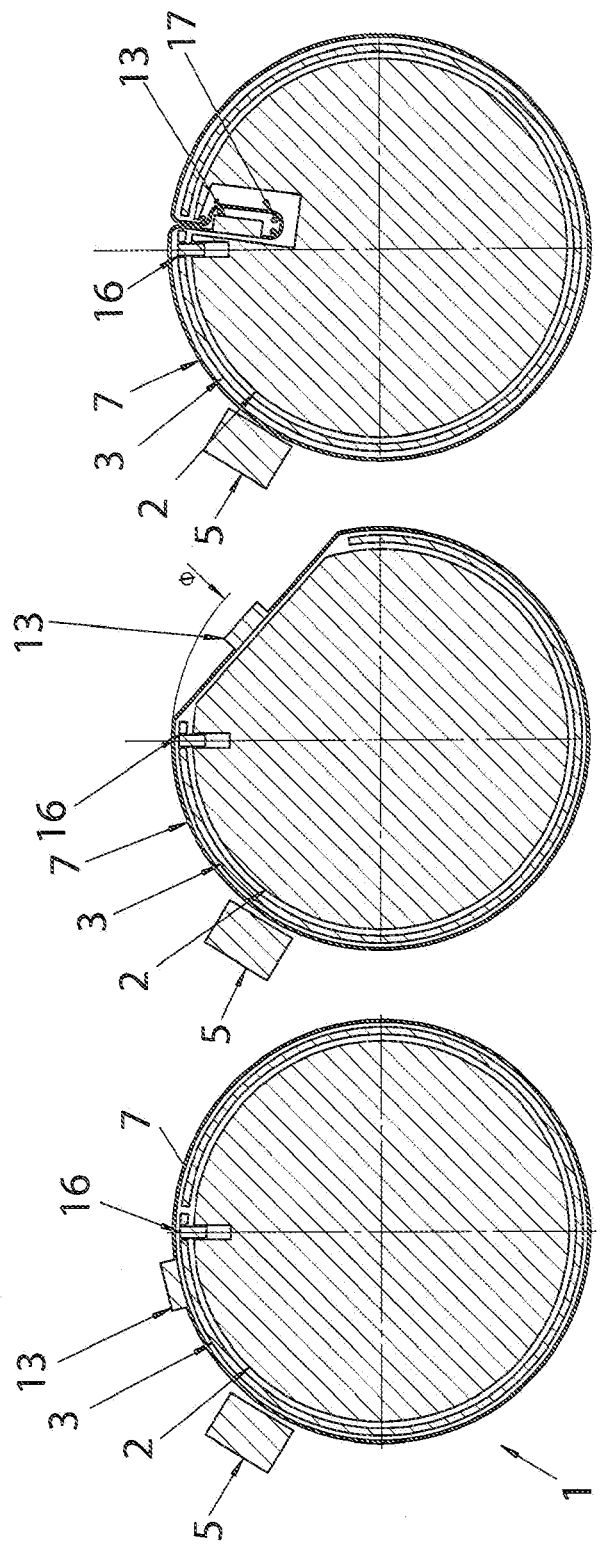

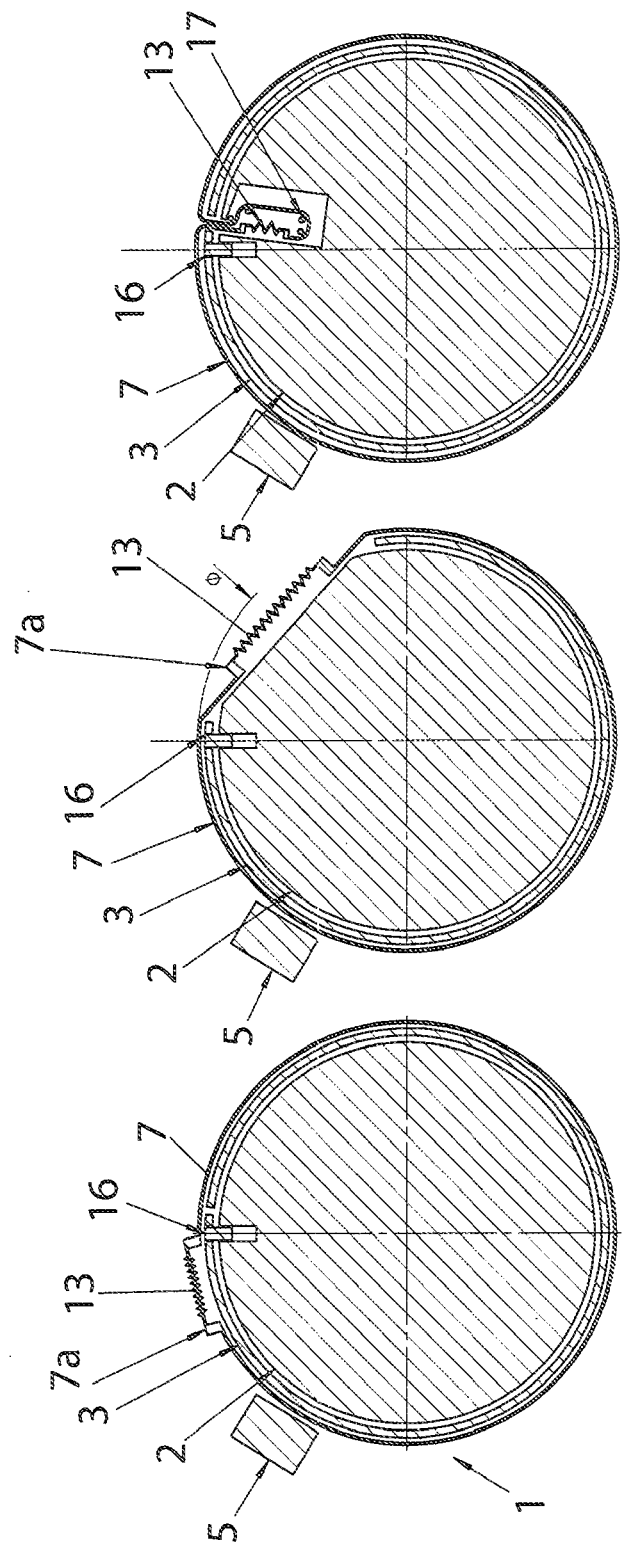

Figure 3A:
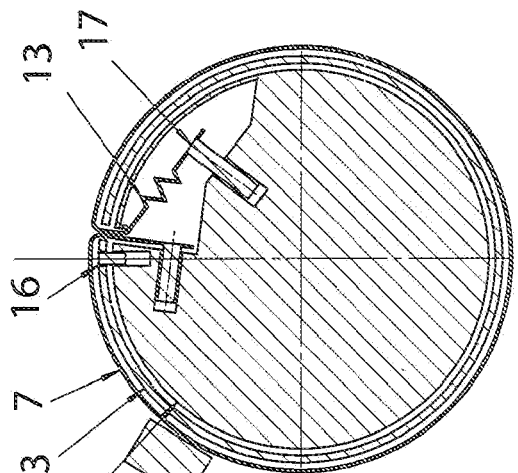

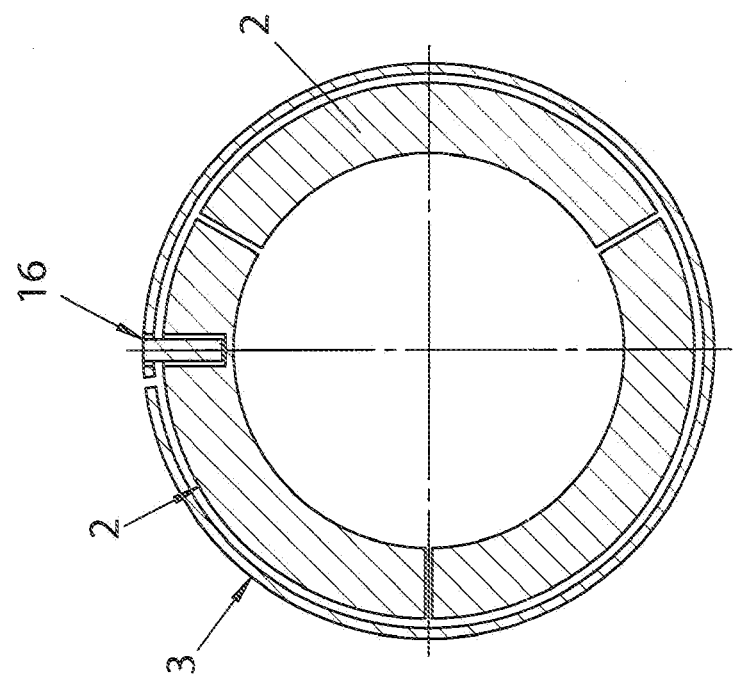
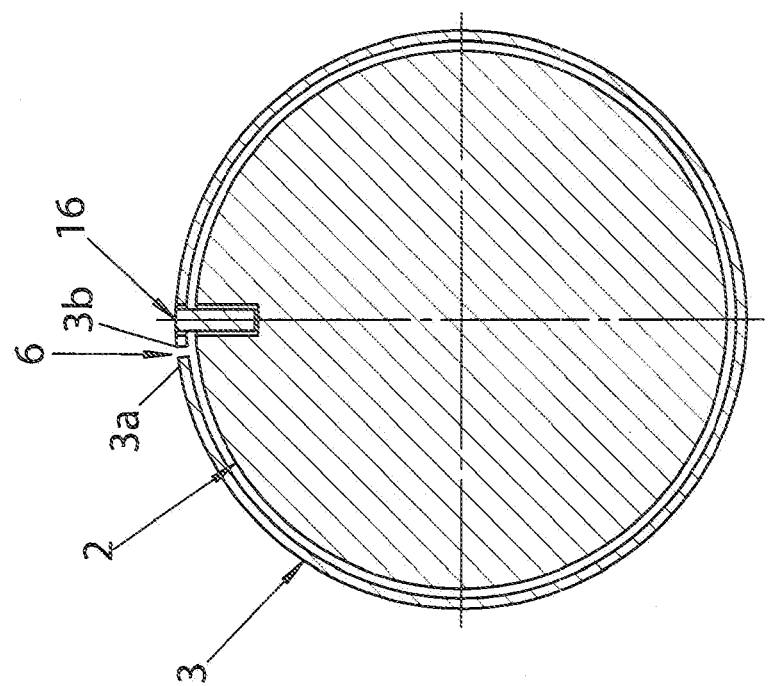

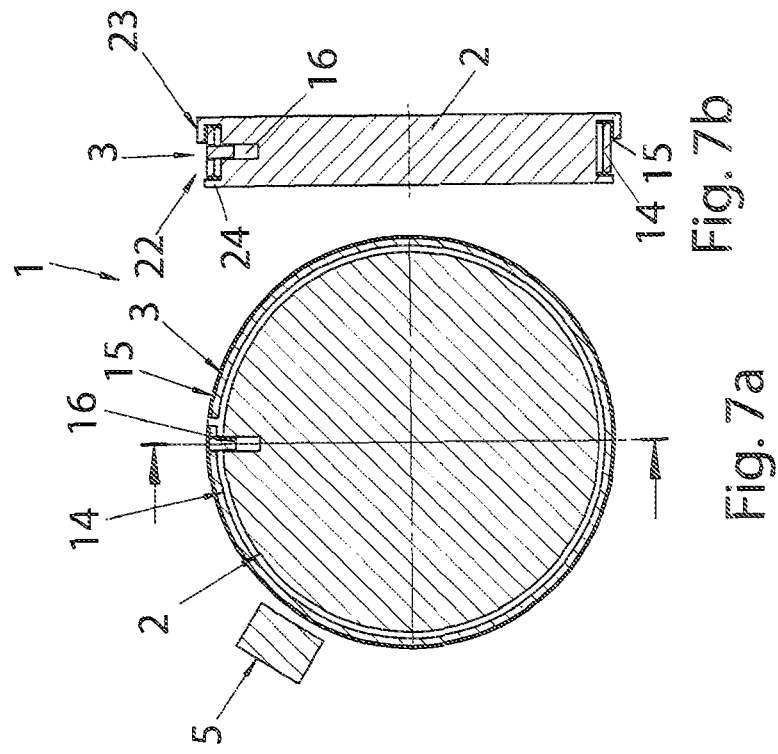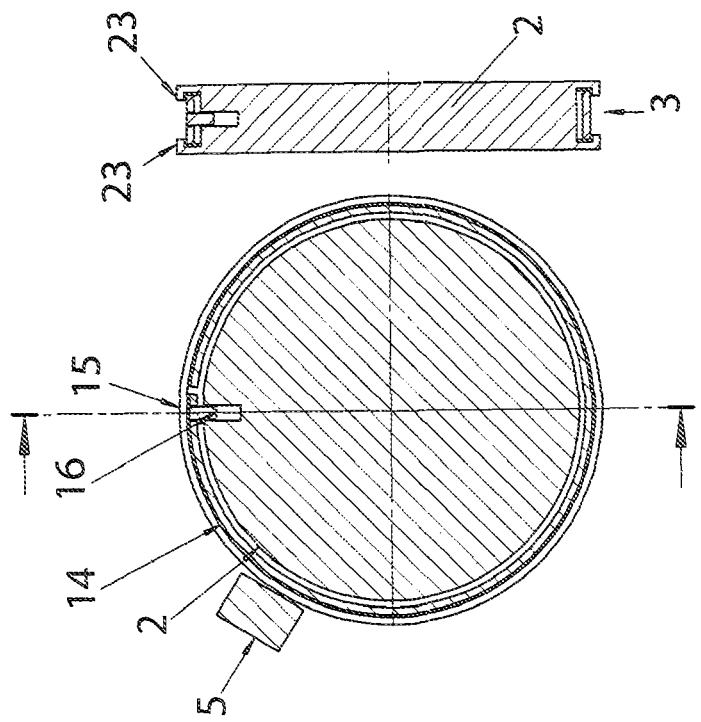

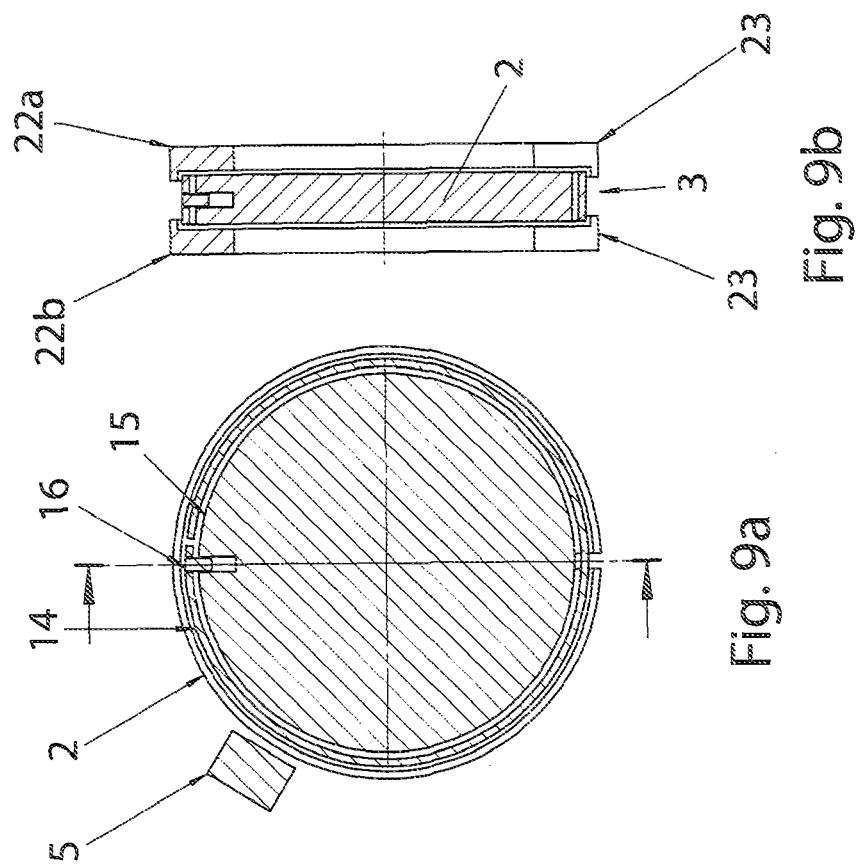
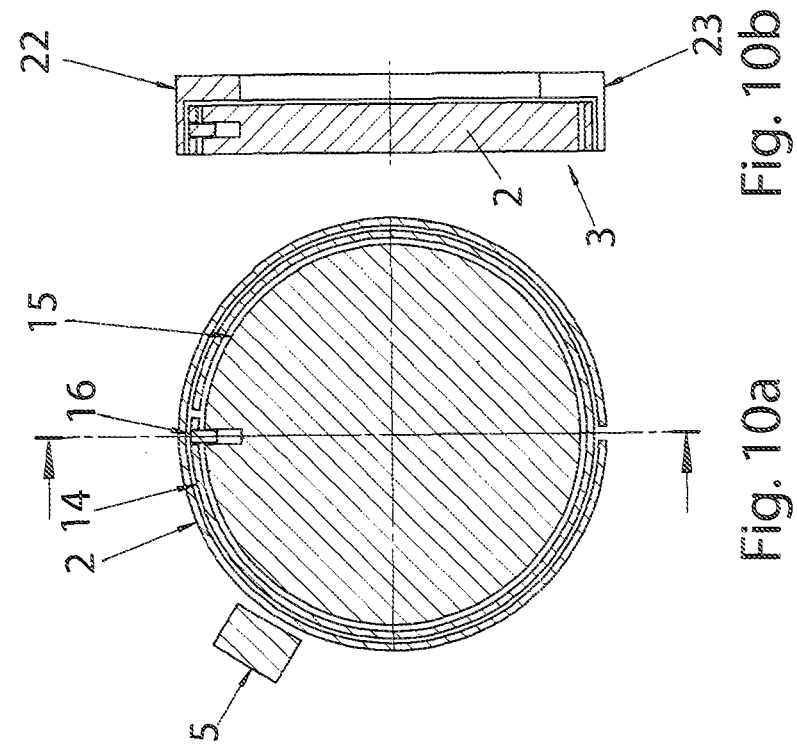

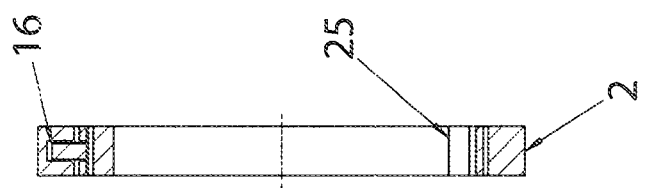
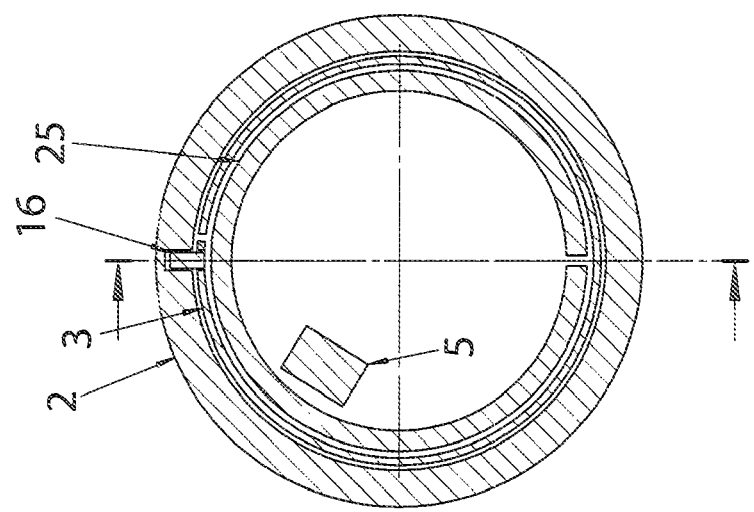

MEASURING RING WITH MEASURING TAPE AND METHOD FOR ARRANGING THE MEASURING TAPE

I. FIELD OF THE INVENTION

The invention relates to a measuring ring to detect an angular position and/or a rotational speed of the measuring ring or a component connected torque proof with the measuring ring relative to a stationary component.

II. BACKGROUND OF THE INVENTION

For this purpose, a scale embodiment configured as a measuring element, e.g. a measuring tape is applied to the circumference, typically the outer circumference of the measuring ring, typically in that the measuring tape is separately produced and subsequently fixated on the circumference of a support ring or a support wheel. It is also feasible to configure the scale embodiment directly on the support ring.

In this context, it is clear that a "ring" can also be a shaft or similar with a massive cross-section in case no inner diameter is required. Furthermore, subsequently, only a measuring tape is discussed without limiting the invention with respect to the measuring element which can also be a cable or similar.

The scale embodiments following one after another in circumferential direction can be configured through different physical principles, e.g. magnetically, optically or mechanically, and are scanned by a reading head through a suitable physical principle, wherein the reading head is arranged stationary at a location of the circumference and arranged at a distance from the measuring tape, thus touch-free when the circumference and thus the scale embodiment move past the reading head during a relative rotation of the measuring ring.

Thus, a preferred embodiment is the magnetic configuration of the scale embodiments.

Measuring wheels with predetermined nominal diameters are commercially available in which the scale embodiments, typically configured as a measuring tape are provided on the entire circumference of the measuring ring, preferably without gaps in order to be able to provide a scanning through the reading head over the entire circumference of the measuring ring.

In particular for magnetic scale embodiments, in particular for a measuring tape applied to the measuring ring, the measuring tape typically is a plastic-based material which is elastic with respect to mechanical loading in its longitudinal extension which has to be considered in particular during production. The measuring tape is also subject to length changes during temperature changes, which has to be considered in particular during operations of the measuring tape since the temperature expansion of the measuring tape is typically different from the temperature expansion of the material from which the support ring of the measuring ring is made and which is typically metal.

This difference in longitudinal extension has little effect for small diameters of the measuring ring so that also for small measuring wheels, a measuring tape of this type can be fixated over the entire circumference at the support ring, e.g. glued or vulcanized. The different length expansion, however, becomes a problem for measuring wheels and their support rings with large diameter, e.g. in the range of one meter and more, and in particular when the support ring is not a circumferentially closed ring, but has one or plural gaps in circumferential direction, e.g. because it has to be assembled from particular segments.

In this case, the measuring tape cannot be permanently connected over the entire circumference with the support ring and can in particular not be applied to the support ring without gaps, in particular not on both sides of a gap in the support ring which can also change its size through temperature- and operational influences.

III. DETAILED DESCRIPTION OF THE INVENTION a) Technical Object

Thus it is an object according to the invention to provide a measuring ring, in particular with a magnetic scale embodiment for large diameters which is simple and cost-effective to manufacture and in which in particular the measuring tape can be replaced in a simple manner. Furthermore, the invention provides a method for attaching a measuring tape at the circumference of a support ring.

b) Solution

This object is achieved through the features of claims 1 and 12. Advantageous embodiments can be derived from the dependent claims.

In a measuring ring of this type, including a support ring, an elongated measuring element e.g. a measuring tape and a reading head, the measuring tape is supported at the circumference through a support element and therefore does not have to be fixated on the circumference of the support ring through gluing or in another manner that is durable works over a larger surface and is only disengageable with difficulty.

The support element can be a clamping element which clamps the measuring tape in radial direction over the circumference of the support ring or also a support element, e.g. a support profile which is fixated or configured at the circumference of the support ring and which supports the measuring tape transversal to its longitudinal extension in a form-locking manner and thus retains it at the circumference.

On the one hand side, this facilitates relative movements due to temperature expansions in circumferential direction between the measuring tape on the one hand side and the support ring on the other hand side, optionally also relative to the tension element, on the other hand side this facilitates a simple replacement of the measuring tape after disengaging the tension element since the measuring tape only loosely contacts the support ring.

The measuring tape does not have to be fabricated as a closed ring, but as a defined element of a measuring tape whose free ends are as closely adjacent to one another in circumferential direction as possible, so that sizing the measuring tape is also possible in a very simple manner for different dimensions of the support ring.

Thus it is basically irrelevant according to which physical principle the scale embodiments are arranged along the measuring tape, thus magnetically, optically, mechanically or inductively if the reading head employed can read these scale embodiments.

Preferably, the measuring tape is fixated at one location of the circumference directly or indirectly relative to the support ring, preferably mechanically fixated, in particular through a disengageable connection, like a radial pin, a bolt or a rivet while in the entire remaining portion, the desired radial movements are feasible in circumferential directions relative to the support ring.

The measuring tape is not bending stiff about bending axes transversal to its longitudinal extension and has to be pressed through a tension element over the entire circumference in outward direction against the inner circumferential surface wherein in particular a clamping chuck or a clamping ring extending substantially over the entire inner circumferential surface is suitable wherein the clamping ring or clamping chuck has to have high shape stability and high internal stiffness.

The measuring tape is not bending stiff about bending axes transversal to its longitudinal extension and has to be pressed through a tension element over the entire circumference in outward direction against the inner circumferential surface in order to applied to the inner circumferential surface, wherein in particular a clamping chuck or a clamping ring extending substantially over the entire inner circumferential surface is suitable wherein the clamping ring or clamping chuck has to have high shape stability and high internal stiffness.

When applying the measuring tape to the outer circumferential surface, it is possible however to use a relatively flexible clamping band as a clamping element, e.g. made from plastic or metal, wherein the clamping element presses the measuring tape radially inward against the support ring solely through clamping in circumferential direction.

Thus, the tension band is typically a finite band like the measuring tape, whose both ends are either clamped relative to one another or fixated at the support ring. In addition to applying tension, typically a separate tension unit is provided which tightens the two ends of the tension element, e.g. the clamping band, relative to one another or relative to the attachment point at the support ring. The tension effect of the tension unit, however, can also be provided through the proper elasticity of the tension band.

In case the tension band is fixated at one point relative to the support ring, for this purpose the same attachment point can be used as for the measuring tape, in particular the same attachment element, e.g. a bolt or a radial pin.

Since the objective of a measuring ring is to be able to scan the rotation position of the measuring ring over the entire circumference of 360 degrees, it is desirable to keep the gap between the ends of the finite measuring tape as small as possible, so that the path on which no signal is obtained from the measuring tape with the same reading head remains as small as possible and if possible no second reading head is required that is displaced relative to the first reading head in circumferential direction.

Additionally, the clamping unit for the clamping element, in particular the clamping band will be arranged with respect to the measuring head that is typically oriented from an outside against the measuring tape on an opposite side of the annular surface defined by the measuring tape, thus e.g. in a flat area of the outer circumference of the support ring or within the support ring.

In the latter case, the ends of the tension band resting on the outside on the circumference and in particular also supported on the outside of the measuring tape are run inward through a gap in the circumference of the support ring and fixated there in particular at an end with the clamping unit arranged there between relative to the support ring or the other end of the tension band.

A tension band supported on the outside of the measuring tape thus protects the measuring tape against mechanical damages and accretion of contamination from the radial outside in addition to fixating the measuring tape.

The tension band can still also be arranged between the measuring tape and the outer circumference of the support ring.

Thus e.g. measuring tapes are known which are configured in two layers, namely from a scale embodiment layer whose form resistance and in particular tension resistance in longitudinal direction is relatively small and a support layer, e.g. made from metal which has a rather high tension resistance and preferably also a pressure resistance in longitudinal direction, at least for a sufficient lateral and/or radially contacting support.

In this case, the scale embodiment layer is permanently connected over its entire length with the support layer, in particular connected with its surface, e.g. glued together or vulcanized together.

The support layer can extend beyond the free ends of the scale embodiment layer and can be used as a tension band.

Thus, the tension band configured as a support layer can be alternatively arranged on the side of the measuring tape that is oriented towards the support ring or on the side of the measuring tape that is oriented away from the support ring.

In case a two-layer measuring tape is used with its support layer oriented towards the support ring, optionally the support layer extended beyond the measuring tape can be used or a tension band additionally placed on the outside onto the measuring tape and extending in circumferential direction for tightening the measuring tape against the support ring. In particular, the support layer and the additional tension band are made from the same material, e.g. stainless steel and in particular the support ring and the tension band have temperature expansion coefficients that are as similar as possible.

For support in axial direction, the support ring can include stops preferably on both sides of the measuring tape, wherein the stops are configured e.g. as flanks of a groove which extends in an annular manner in circumferential direction and supports the measuring tape.

In case the gap between the ends of the measuring tape is large enough so that the reading head is not supplied with information, a second reading head can be arranged whose distance to the first reading head in circumferential direction is significantly larger than the size of the gap of the measuring tape and in particular the two reading heads are offset relative to one another by 180 degrees.

In case a gap is provided in the support ring in circumferential direction, e.g. because the support ring has plural components in circumferential direction, the gap can be used to run a tension band from the outer circumference through the gap into the interior of the clamping ring and to fixate it therein as described. Alternatively the tension unit for the tension band can also be arranged in a flattened portion of the outer circumference. However, in this flattened portion, typically there is no measuring tape on the outer circumference and the circumferential portion in which the reading head does not include information is relatively large.

For a clamping element, also magnetic force between the clamping band and the support ring can be used either in that the measuring tape itself is sufficiently magnetic or support magnets are arranged in the support ring and the measuring tape is made from a magnetizable material.

For a measuring ring thus configured, the method for supporting the measuring tape at the outer circumference of the support ring is performed so that the measuring tape is applied at the outer circumference of the support ring in the desired position and additionally a clamping element is directly or indirectly arranged at the circumference of the support ring and is pressed or pulled in radial direction against the circumference through tightening the tension element, depending whether the tension element, in particular a tension band, is arranged radially within or outside of the measuring tape.

When applying the measuring tape to the circumference of the support ring, a fixation of the measuring tape relative to the support ring can also be additionally provided at one location.

Also the tension element in particular the tension band can be fixated at one location relative to the support ring.

In case the measuring tape is not fixated at any location relative to the support ring, an absolute referencing of the reading head relative to the support ring has to be provided in case the measuring tape moves over its entire length relative to the support ring, wherein the referencing is provided through applying and scanning a reference mark whose position relative to the support ring is fixated, thus which is not on the measuring tape.

When the measuring tape is arranged at the inner circumference of the support ring, it can be pressed through a clamping sleeve in outward direction against the inner circumference, wherein the clamping sleeve has to be inserted radially from within the measuring tape and spreads through internal tension or through an actively actuated clamping unit.

In a tension band, either the ends of the tension band are tightened relative to one another through a tension unit or an end of the tension band is directly attached at the support ring and the other end is attached to the support ring through a tension unit.

When using a support element instead of a tension element, initially the support element is fixated at the circumference of the support ring, thus either fixated over the entire circumference along the support ring or in turn only fixated at one location of the circumference relative to the support ring.

The support, in particular a support profile, is preferably at least open at one end in its extension direction, so that the scale element, e.g. the measuring tape can be inserted in circumferential direction into the support element.

Thus, the support is configured so that e.g. for a temperature induced length change of the measuring tape, the measuring tape can move relative to the support element, thus the support profile, but cannot move in transversal direction thereto through the form-locking support.

For this purpose, the measuring tape is preferably fixated at one location of the circumference relative to the support profile and can only move relative to the support profile over the rest of its circumference.

The fixation point thus represents a reference point relative to the support element and the one or plural fixation points of the support element represent one or plural reference points relative to the support ring.

A disadvantage of this solution, however, is that a support element of this type shall closely contact the circumference of the support ring and thus has to precisely follow its curvature which typically requires a separate manufacture of the support element for each diameter of the support ring, preferably as a seamless continuous ring, whereas when using a tension element, typically the measuring tape and also the tension element are cut from a quasi endless base material to the required length.

c) Embodiments

Figure 3B:
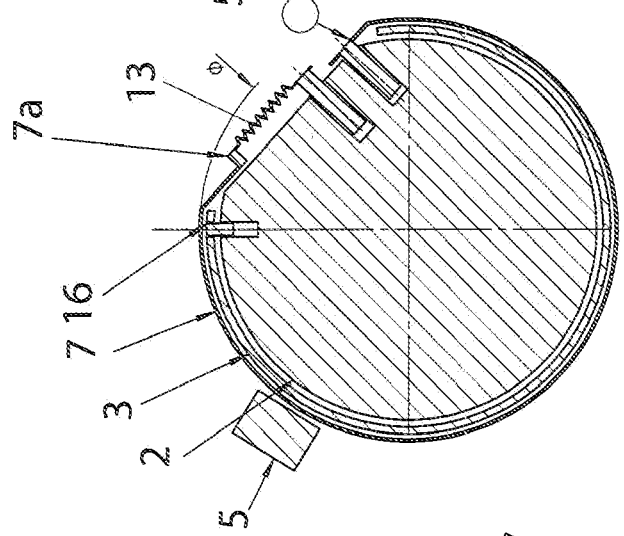
Figure 3C:
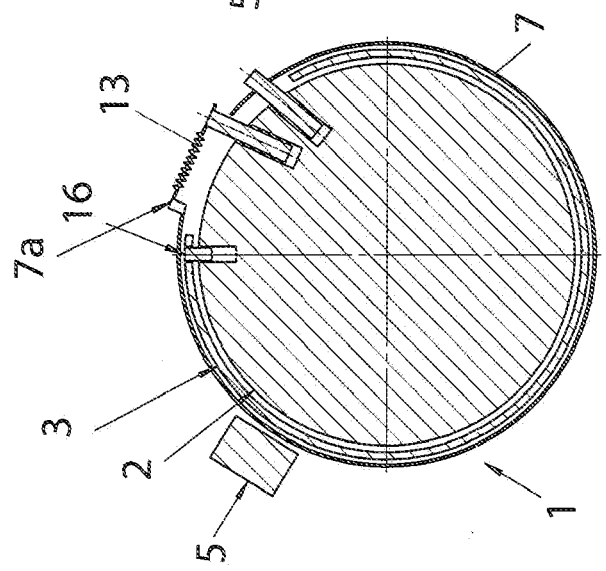
Figure 5A:
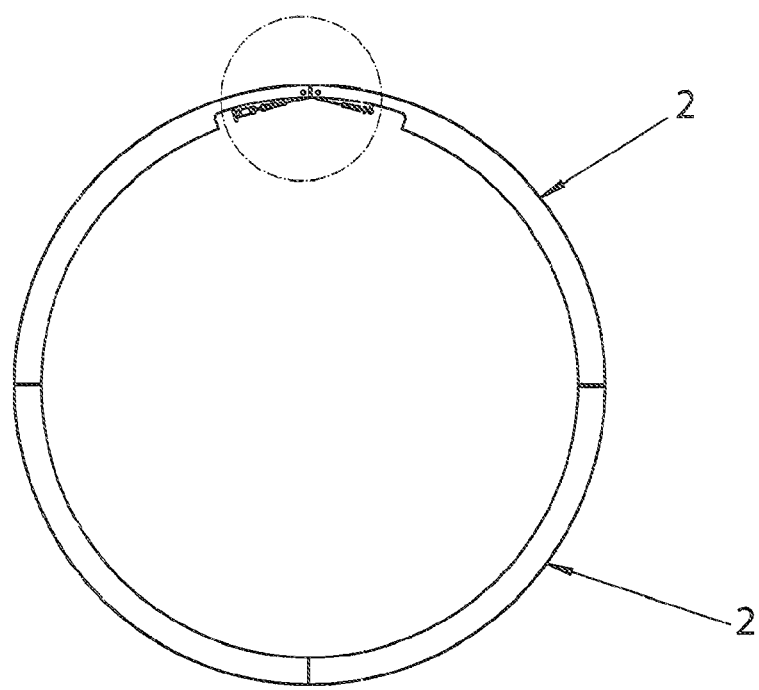
Figure 5B:
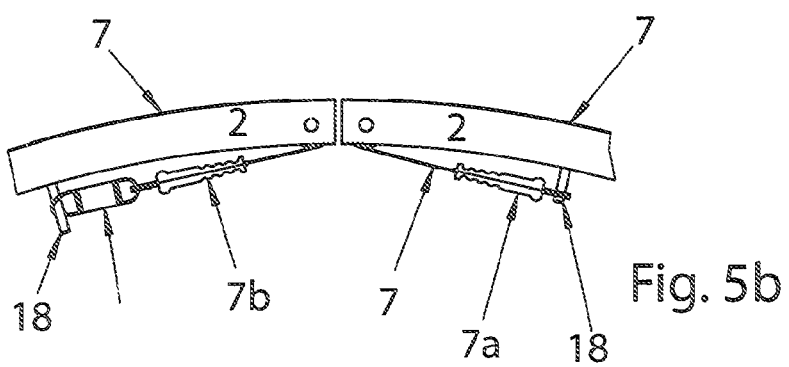
Figure 5C:
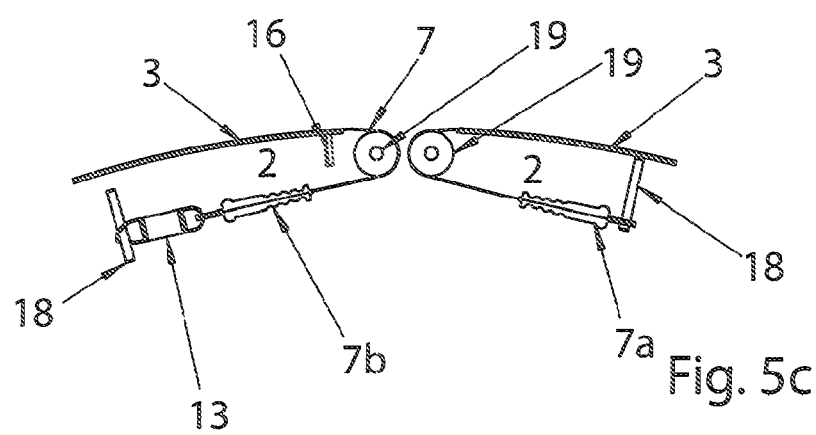
Figure 6A:
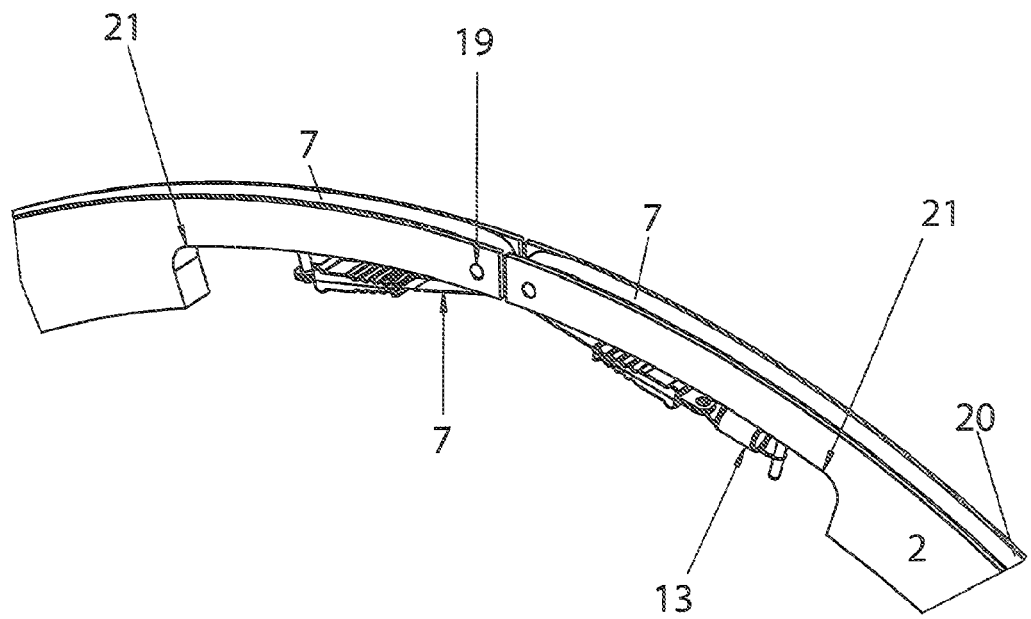

Embodiments of the invention are subsequently described in more detail with reference to drawing figures, wherein:

FIG. 1a-c: illustrates a first embodiment of the measuring ring with tension element;

FIG. 2a-c: illustrates embodiments of the measuring ring with a spring for tightening the tension band;

FIG. 3a-c: illustrates embodiments with a fixation of the tension band at the support ring:

FIG. 4a, b: illustrates various support rings;

FIG. 5a, b, c: illustrates a solution with a segmented support ring;

FIG. 6a, b: illustrates a perspective view of the solution according to FIG. 5;

FIG. 7a, b: illustrates a first embodiment with an integrated support element;

FIG. 8a, b: illustrates a second embodiment with an integrated support element;

FIG. 9a, b: illustrates a first embodiment with a separate support element;

FIG. 10a, b: illustrates a second embodiment with a separate support element;

FIG. 11a, b: illustrates a third embodiment with a separate support element.

Initially FIGS. 4a and b illustrate a cross-section of an attachment of a measuring tape 3 at a support element according to the invention, wherein the support element in FIG. 4a is a solid shaft and in FIG. 4b it is a support ring 2 divided into three segments.

The measuring tape 3 contacts the outer circumference of the support element, in particular of the support ring 2 and encloses the support ring 2 over the largest circumferential portion possible, so that the gap 6 provided between the ends 3a, b of the measuring tape 3 is as small as possible. At the most at one location of the circumference in this case at one end of the measuring tape 3, the measuring tape is fixated through a fixation pin 16 in a form locking manner relative to the outer circumference of the support element.

In the segmented support ring of FIG. 4b, the measuring tape 3 extends over the gaps between the segments.

In FIGS. 1 through 3, the measuring wheel 1 is completely illustrated with a tension element, namely with the necessary components of a support ring 2 which can also be a massive shaft, a measuring tape 3 contacting the outer circumference of the support ring, wherein the measuring tape is fixated at one circumferential location through a fixation pin 16 in circumferential direction and also in axial direction relative to the support ring 2, a tension band 7 which extends along the circumference and a reading head 5 which is arranged outside of the measuring tape 3 and arranged fixated in place at a distance thereto, wherein the reading head counts the passing scale embodiments of the measuring tape 3 when the support ring is rotated.

In FIGS. 1a through c, the tension band 7 contacts the measuring tape 3 on the radial outside and the free ends of the tension band 7 are tightened relative to one another through a tension unit 13 which presses the measuring tape 3 radially inward closely contacting the outer circumference of the support ring 2.

In FIG. 1a, the support ring 2 has a circular outer circumference and the tension unit 13 which has a greater thickness than the tension band 7 contacts the outside of the measuring tape 3 and protrudes beyond the tension band 7 in radially outward direction, so that a 360 degree rotation of the support ring 2 is not possible, since the tension unit 13 would contact the reading head 5 positioned closely adjacent to the tension band. This solution is only feasible for applications in which no rotation of the support ring 2 over more than 360 degrees needs to be detected.

This problem does not occur in the solutions of FIGS. 1b and 1c.

In the solution of FIG. 1b, the circular outer circumference of the support ring 2 includes a flat area at one location wherein the flat area is large enough to completely dispose the tension unit 13 of the tension band 7 within the enveloping circle of the support ring 2 in the portion of the flat area.

However, in this case the measuring tape 3 only extends over the circular portion of the outer circumference of the support ring 2, thus not in the portion of the flat area so that no measurement of the rotation position through the reading head 5 would be possible over a relatively large angular area.

In the solution according to FIG. 1c, however, no gap is in the outer circumference of the circular support ring 2 and the measuring tape 3 reaches on both sides with both free ends directly towards this gap.

The tension band 7 applied to the outside of the measuring tape 3, wherein the tension band which is longer than the measuring tape 3 is run with its free ends through this gap into an open space in the interior of the support ring 2 and therein the two ends of the tension band with one of them run for this purpose over deflection pulleys 17 or deflection pins in turn are tightened relative to one another through the tension unit 13.

For a 360 degree rotation of the support ring 2, on the one hand side there is no obstacle in the movement path of the reading head 5 besides the very small gap in the support ring 2 and also in the measuring tape 3, wherein the gaps in the support ring 2 and in the measuring tape 3 coincide so that the reading head 5 receives a signal over the entire 360 degree range.

The solutions of FIGS. 2a through c differ from the solutions of FIGS. 1a through c in that a spring is used in particular as a tension unit 13 wherein the tension unit always maintains the tension provided through the spring 13, thus also for length changes of the tension band 7 due to temperature variations. The tension unit 13 in FIGS. 1a through 1c however can also be a turnbuckle which is brought to a particular preload e.g. by threading a tension bolt forward in a nut, wherein the preload changes again when the length of the tension band 7 changes subsequently.

While the tension band 3 was only fixated through a fixation pin 16 in circumferential direction relative to the support ring 2 in the solutions of FIGS. 1a through c and 2a through c, in the solutions of FIGS. 3a through c which besides that correspond to the solution according to FIGS. 2a through c, also the tension band 7 is fixated relative to the support ring 2 at both ends through a respective fixation pin which is partially inserted in the support ring and typically radially protrudes there from like the fixation pin 16. Thus the spring 13 is arranged between 1 and 7a of the tension band 7 and the adjacent fixation pin.

As illustrated in FIG. 3c, the fixation pins do not have to protrude from the outer circumference of the support ring 2 but they can also be attached in the walls of the recess in the interior of the support ring 2.

FIG. 5b illustrates a detail enlargement for a solution with a segmented support. ring 2 according to FIG. 5a with a gap in the circumference through which the ends 7a, b of the tension band 7 are run into the interior of the support ring 2 and wherein 1 and 7a is directly fixated relative to the support ring 2 through a fixation pin and the other end 7b however is fixated relative to the support ring 2 through a spring arranged there between and providing the preload.

In the solution according to FIG. 5a through c, the measuring tape 3 is inserted between the tension band and the outer circumference of the support ring 2. In case the temperature expansion of measuring tape 3 and tension band 7 coincides the measuring tape 3 can also be glued onto the inside or outside of the tension band 7, wherein the free ends 3a, b of the tension band respectively directly reach to the gap in the support ring 2.

FIG. 5c in which the support ring 2 is omitted in order to better detect the remaining components, it is evident that stationary or rotatable deflection pulleys 19 are arranged proximal to the gap in the support ring 2, wherein the tension band 7 is placed over the deflection pulleys and wherein fixation pins protruding from the inside of the support ring 2 are run towards the tension band 7.

The ends 7a, b of the tension band 7 are provided with a ribbed rubber coating for better grip. The solutions of FIGS. 5a through c are illustrated in FIG. 6 in a perspective view.

Figure 6B:
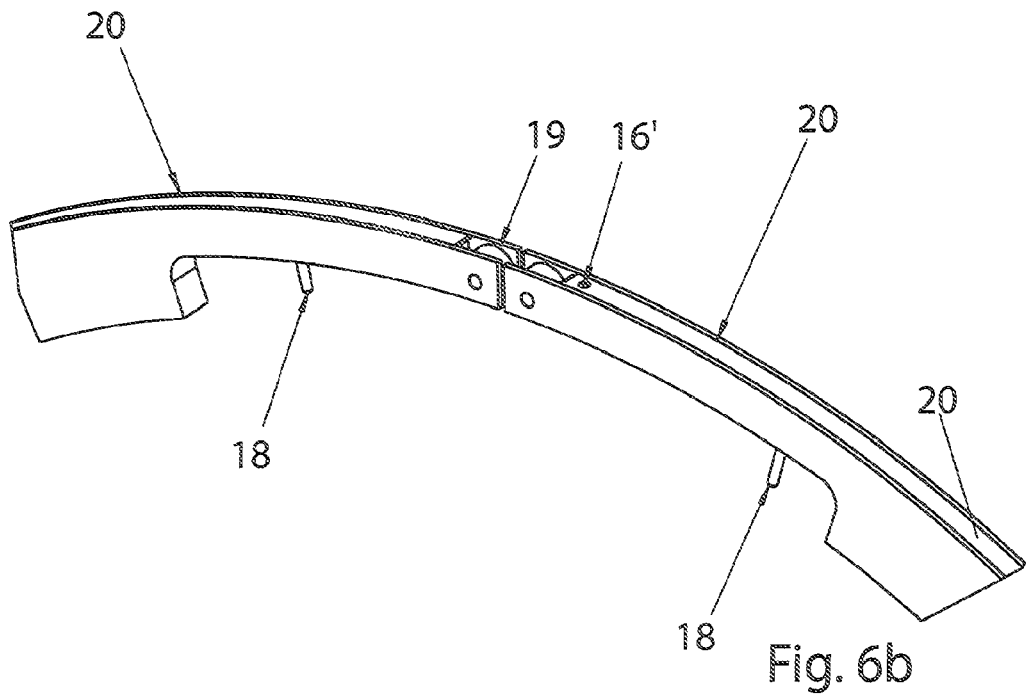

FIG. 6b only illustrates a support ring 2, thus without tension band 7 and measuring tape 3, however with the fixation pins 18 and the deflection rollers 19. Furthermore, the indentation 16' for receiving the fixation pin 16 is visible in the outer circumference.

It is furthermore visible in FIGS. 6a, b that a circumferentially extending groove 20 is configured in the outer circumference of the support ring 2, wherein the inner width of the groove is slightly smaller than the width of the measuring tape 3 so that the flanks of the groove support the measuring tape 3 and preferably also the tension band 7 in axial direction.

In FIGS. 6a, b a recess 21 is furthermore provided on the inside of the support ring 2 in the portion in which the inward run ends of the tension band 7 and the tension unit 13 have to be received.

In the solutions of FIGS. 7a, b, a support profile 22 for the measuring tape 3 is configured on the outer circumference of the support ring 2 which is configured herein from solid material, e.g. as a disc, wherein the measuring tape 3 preferably extends over the entire circumference and viewed in cross-sectional direction of the support profile 2 only on one side of the measuring tape 3, an envelopment 23 up to the outside of the measuring tape 3 which is inserted into the support profile is provided, however on the opposite side only a protrusion 24 is provided which supports a side surface of the measuring tape 3 in a form locking manner.

Thus the measuring tape 3 can be easily inserted in axial direction with one edge under the envelopment 23 and can then be pieced in the support profile. A subsequent slide out is not to be expected due to the limited internal stiffness of the measuring tape 3 and the fixation at one location of the circumference between the measuring tape 3 and the support ring 2 through the fixation pin 16. Remote from the fixation pin 16, however, the measuring tape 3 can expand or contract any time in its extension direction relative to the support profile 22 and thus the support ring 2.

The solution of FIGS. 8a, b differs in that the support profile 22 also configured at the support ring 2 has an envelopment 23 on both sides of the measuring tape 3 into the edge portion of its outside which provides safe support for the measuring tape 3 but makes its insertion more difficult in that e.g. a gap in the support profile 22 is provided for inserting in longitudinal direction of the measuring tape 3.

In both cases, the measuring tape 3 is configured in two layers with a support layer 15 and with a scale embodiment layer 14 which are permanently connected with one another on their entire length.

Thus, it depends from the sensitivity of the reading head 5 and the material of the support layer 15 whether as illustrated in FIGS. 7a, b and 8a, b, the support layer 15 is arranged as an additional protection and the scale embodiment layer 14 is arranged on the radial inside relative thereto or vice versa. The solutions of the following FIGS. 9 through 11 differ from the solution of FIGS. 7 and 8 in that the support profile 22 is not configured as a support profile that is integrally configured at the support ring 2, but as a separate component.

In FIGS. 9a, b, each of the two envelopments 23 are made from a separate support profile 22a, 22b which in this case is configured as a ring which is respectively laterally arranged at the disc-shaped support ring and the measuring tape 3 circumferentially applied thereto. The necessary fixation of the two support profiles 22a, 22b relative to one another and/or relative to the support ring 2 is not illustrated in the FIG.s.

In the solution according to FIGS. 10a, b, differently from FIG. 9a, b, only one support profile 22 is provided which is arranged as a ring axially on one side at the support ring 2.

However, the envelopment 23 is large enough so that it does not only reach over the edge portion of the measuring tape 3 but reaches over its entire extension in transversal direction up to the opposite edge of the measuring tape 3 and thus e.g. the face of the support ring 2.

From this side, the measuring tape 3 during assembly is also insertable in the radial intermediary space between support ring 2 and support profile 22 after a fixation relative to the support ring 2 and/or the support profile 22 and it will not move there from independently when the measuring tape 3 has sufficient internal stiffness.

In order to apply the fixation pin 16, a gap is preferably provided in the envelopment 13 at a circumferential location.

FIG. 11 illustrate a solution in which the measuring tape is arranged at an inner circumference of a support ring and fixated at a circumferential location through a fixation pin 16. Thus a tension sleeve 25 is used as a tension element, wherein the tension sleeve is inserted radially inside the support ring 2 and the measuring tape 3 as a ring that is slotted at a circumferential location and presses the measuring tape 3 in outward direction against the inner circumference of the support ring 2 due to the internal tension of the tension element.

Reference Numerals and Designations

1 Measuring ring
2 Support ring
3 Measuring tape
3a, b End
4 Scale embodiment
5 Reading head
6 Gap
7 Tension band
8 Stop
9 Gap
10 Axial direction
11 Radial direction
12 Circumferential direction
13 Tension unit, spring
14 Scale embodiment layer
15 Support layer
16 Fixation pin
16' Indentation
17 Deflection pulley
18 Fixation pin
19 Deflection pulley
20 Nut
21 Recess
22a, b, 22 Support profile
23 Envelopment
24 Protrusion
25 Tension sleeve

The invention claimed is:

1. A measuring ring (1), comprising:
a rotatable support ring (2);
a measuring element, having a measuring tape (3) on which scale embodiments (4) are configured, wherein the measuring element extends along the outer circumference of the support ring (2) and is attached thereto;
a reading head (5) for reading the scale embodiments (4), wherein the reading head is arranged at a distance from the measuring tape (3), and is arranged relative thereto, movable in circumferential direction at a circumferential location,
wherein a retaining element is arranged at the circumference of the support ring (2), wherein the retaining element radially retains the measuring tape (3) at the circumference;
wherein the retaining element is a tension band (7) which pulls the measuring tape (3) radially against the circumference or slashes it radially against the circumference;
wherein the measuring tape (3) is arranged along the outer circumference of the support ring (2);
wherein the tension band (7) extending in circumferential direction (12) is longer than the measuring tape (3);
wherein the measuring tape (3) is fixated at the support ring, in a form locking manner only at one location of the circumference in circumferential direction;
wherein the measuring tape (3), when arranged on the outer circumference is supported between the tension band (7) and the outer circumference, at least with the majority of its longitudinal extension movable relative to the tension band (7) and/or relative to the outer circumference of the support ring (2).

2. The measuring ring according to claim 1,
wherein the retaining element is a support profile (22), which is configured along the circumference of the support ring (2) and supports the measuring tape (3) transversal to its extension, thus transversal to the circumferential extension (12) in a form locking manner.

3. The measuring ring according to claim 2,
wherein the tension unit (13) of the tension band (7), is arranged radially with respect to the measuring tape (3) or the plane of the measuring tape (3) on the opposite side with respect to the reading head (5) and/or
wherein the tension band (7) is made from plastic or metal, in particular stainless steel and/or a non-magnetic metal.

4. The measuring ring according to claim 3,
wherein the measuring element when arranged at the inner circumference of the support ring, the measuring tape (3), is supported between the tension sleeve and the inner circumference.

5. The measuring ring according to claim 2,
wherein the measuring tape (3) is arranged along the interior circumference of the support ring (2) and the tension element is a tension sleeve.

6. The measuring ring according to claim 1,
wherein the scale embodiments (4) are configured on the measuring tape (3) in a magnetic, optical or mechanical manner, and/or the reading head operates in a magnetic, optical, physical, inductive or capacitive manner, and/or
wherein the measuring tape (2) includes a first and a second end 3a, b in circumferential direction (12) and a gap (6) is provided between the two ends (3a, b).

7. The measuring ring according to claim 1,
wherein the measuring tape (3) is configured with plural layers including a scale embodiment layer (14) and a support layer (15) and the support layer (15) has a smaller length expansion coefficient than the scale embodiment layer (14) and/or
the measuring tape (3), support layer (15), is relievable from pressure in longitudinal direction of the measuring tape (3), when a radial inner and/or outer support is provided.

8. The measuring ring according to claim 7,
wherein the support layer (15) of the measuring tape (3) is extended beyond the ends of the scale embodiment layer (14), and/or
wherein the support layer (15) and the tension band (7) are made from the same material when an additional separate tension band is provided relative to the support layer (15) of the measuring tape (3).

9. The measuring ring according to claim 1,
wherein the support ring (2) includes one or plural stops (8) in axial direction (10) for axially supporting the measuring tape (3) and/or
wherein the measuring ring includes a second reading head (5) in circumferential direction (12) offset from the first reading head (5) and the distance in circumferential direction (12) is greater than the gap (6) between the ends (3a, b) of the measuring tape (3), in that the offset is 180 degrees.

10. The measuring ring according to claim 1,
wherein a tension unit (13) is arranged between the free ends (7a, b) of the tension band (7) or a tension unit is arranged between a point of the support ring (2) and an end (7a) of the tension band (7) while the other end (7b) of the tension band (7) is fixated relative to another point of the support ring (2) and/or
wherein the tension unit is arranged in a flattened portion of the circumference of the support ring (2) or for an arrangement of the measuring tape (3), on the outer circumference in the interior of the support ring (2), or for an arrangement of the measuring tape (3), at the inner circumference of the support ring (2), on the outside of the support ring (2).

11. A method for supporting a measuring tape (3) at a circumference of a support ring (2), in particular a measuring ring (1) according to claim 1, comprising the steps of:
applying the measuring tape (3) at the circumference of the support ring (2);
arranging a tension element directly or indirectly at the circumference of the support ring (2); and
pressing or pulling a separate tension band (7) radially against the circumference through tightening the tension element.

12. The method according to claim 11,
wherein the measuring element, in particular the measuring tape (3) is arranged at the inner circumference of the support ring (2) and radially within the measuring tape (3), a tension sleeve is provided which spreads through internal tension or through an actively actuated tension unit (13) and presses the measuring tape (3) in radial direction (11) to the outside against the inner circumference of the support ring (2), or
the measuring tape (3) is arranged at the outer circumference of the support ring (2) and as a tension element, a tension band (7) is applied along the outer circumference of the support ring (2) and tightened and thus the measuring tape (3) is pressed or pulled in radial direction (11) against the outer circumference.

13. The method according to claim 11,
wherein the tension band (7) is applied on the radial outside to the measuring tape (3), and connected in circumferential direction (12) at the most at one location with the measuring tape (3) and/or
wherein for a measuring element applied to the outer circumference of the support ring (2), in particular a measuring tape (3), the tension band (7) is fixated over the entire extension in circumferential direction (12) with the measuring tape (3), glued together and extends beyond the ends (3a, b) of the measuring tape (3), beyond the protruding ends (7a, b) of the tension band (7) and is run through a gap in the outer circumference of the support ring (2) into the interior of the support ring (2) and fixated therein.

14. The method according to claim 11,
wherein the at least one end (7a) of the tension band (7) is connected and tightened through a tension unit (13) relative to a fixed point of the support ring (2) or relative to the other end (7b) of the tension band (7).

15. The method according to claim 11,
wherein the tension unit (13) is arranged with respect to the measuring tape (3) on a side opposite to the reading head (5), thus radially within or outside, and/or
wherein the tension band (7) before tightening the tension unit (13) is fixated at one location of the circumference relative to the support ring (2), in particular at the same location as the measuring tape (3), and fixated through the same fixation element.

16. A measuring ring (1), comprising:
a rotatable support ring (2);
a measuring element, having a measuring tape (3) on which scale embodiments (4) are configured, wherein the measuring element extends along the outer circumference of the support ring (2) and is attached thereto;
a reading head (5) for reading the scale embodiments (4), wherein the reading head is arranged at a distance from the measuring tape (3), and is arranged relative thereto, movable in circumferential direction at a circumferential location,
wherein a retaining element is arranged at the circumference of the support ring (2), wherein the retaining element radially retains the measuring tape (3) at the circumference;
wherein the measuring tape (3) is configured with plural layers including a scale embodiment layer (14) and a support layer (15) and the support layer (15) has a smaller length expansion coefficient than the scale embodiment layer (14) and/or
the measuring tape (3), support layer (15), is relievable from pressure in longitudinal direction of the measuring tape (3), when a radial inner and/or outer support is provided.

* * * * *